E. B. BARKER.
CAMERA.
No. 171,643.            Patented Jan. 4, 1876.
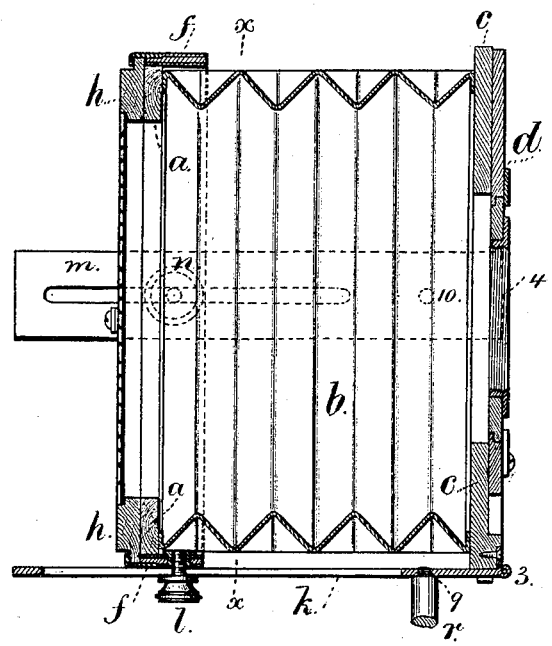
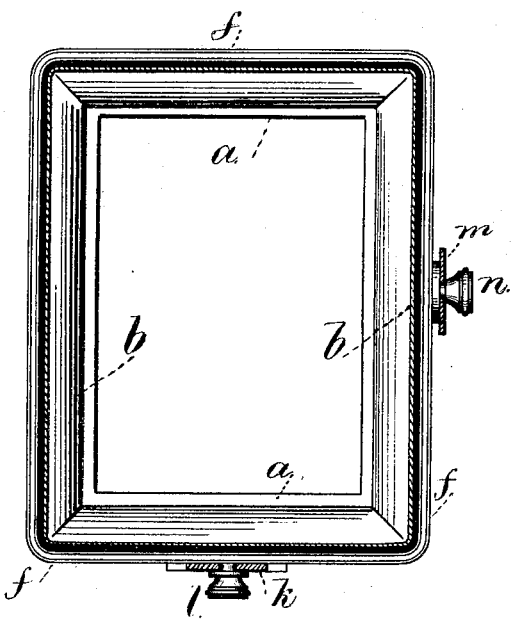
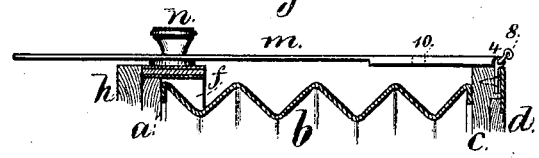
Witnesses.
Chas. H. Smith
Harold Serrell
Inventor
Erastus B. Barker
per Lemuel W. Serrell
atty

UNITED STATES PATENT OFFICE.

ERASTUS B. BARKER, OF NEW YORK, N. Y., ASSIGNOR TO E. AND H. T. ANTHONY & CO., OF SAME PLACE.

IMPROVEMENT IN CAMERAS.

Specification forming part of Letters Patent No. 171,643, dated January 4, 1876; application filed November 13, 1875.

*To all whom it may concern:*

Be it known that I, ERASTUS B. BARKER, of the city and State of New York, have invented an Improvement in Cameras, of which the following is a specification:

This improvement relates to a portable camera, especially adapted to traveling artists. The box of the camera is made with rounded corners, and an inclosure for the bellows, of two or more thicknesses of veneer, bent to shape and glued together, so as to form a very light and strong box. The slide and connection from the front to the back ends of the camera is made of a metal plate, that is hinged at one end and slotted, and provided with a clamping-screw, so that the parts can be held in their correct relative position when the focus has been obtained, and the tripod, which is preferably a folding one, so as to be used as a walking-cane, is screwed to this plate. A second plate, similarly hinged and constructed, is employed at another side of the camera, so that the camera can be turned with its longest measurement either horizontal or vertical. When the camera is folded one of these plates folds around and across the end, and the other can be removed by drawing out the hinge-pin.

In the drawing, Figure 1 is a vertical longitudinal section. Fig. 2 is a cross-section at the line $x\,x$, and Fig. 3 is a partial horizontal section of my improved camera.

The frame $a$ is of a size to receive one end of the extension-bellows $b$, and the frame $c$ receives the other end of said bellows. The slide $d$ at the front end of the camera is adapted to receive the lens-tube, as usual, and the construction of this slide and the connected parts is well known, and needs no further explanation. Around the frame $a$ is the camera-box $f$, that incloses the bellows when the box is closed against the front $c$ of the camera. This box $f$ is of two or more thicknesses of veneer, bent at the corners, so as to avoid the miter-joints usually employed, and to lessen weight and the space occupied, and to make a very strong and durable inclosure. The slide $h$ at the back end runs in grooves, and receives either a plate or a focus-glass, and it may be moved endwise out from between the grooved slides when the plate-holder is slipped into its place. The plate $k$ is hinged to $c$ at 3, and slotted. The adjusting or clamping screw $l$ in the slot, and passing into the frame $a$ or box $f$, serves to hold the parts when adjusted. The plate $m$, similarly hinged at 4, and slotted, is provided with a clamping-screw, $n$. These two plates serve to maintain the parallelism of the two ends of the camera, and to allow of the adjustment of the focus. The plate $k$ can be turned around, so as to pass across one end of the camera to occupy but little space in packing, and the plate $m$ can be removed by withdrawing the pin 8 of the hinge 4. There are screw-holes at 9 and 10 in the bars $k\,m$, so that the camera can be attached at either plate to the tripod or stand at $r$.

It is generally preferable to attach the slotted plates $k\,m$ to the box by hinges; but any other connection, such as pins and a screw, may be provided, so that the said plates may be removed from the box when it is folded up.

I am aware that various articles have been made of two or more thicknesses of veneers glued together. My camera-box with rounded corners, made of veneers and connected to the frame $a$ or $e$, is a new and useful article.

I claim as my invention—

1. The camera-box $f$, for inclosing the bellows, made of two or more thicknesses of veneers, bent at the corners of the box, in combination with the frame $a$ or $e$, to which such box $f$ is attached, for the purposes and as specified.

2. The removable slotted plate $k$ or $m$, attached at one end to the camera-box, and to the other part of said box by a clamping-screw, and provided with a screw attachment for the tripod, substantially as set forth.

Signed by me this 9th day of November, 1875.

ERASTUS B. BARKER.

Witnesses:
GEO. T. PINCKNEY,
CHAS. H. SMITH.